US012750372B2

(12) United States Patent
Lu et al.

(10) Patent No.: US 12,750,372 B2
(45) Date of Patent: Sep. 29, 2026

(54) INFORMATION PROCESSING METHOD AND APPARATUS, DEVICE AND MEDIUM

(71) Applicant: Beijing Youzhuju Network Technology Co., Ltd., Beijing (CN)

(72) Inventors: Shaoxun Lu, Beijing (CN); Haiyu Tang, Beijing (CN)

( * ) Notice: Subject to any disclaimer, the term of this patent is extended or adjusted under 35 U.S.C. 154(b) by 0 days.

(21) Appl. No.: 18/858,255

(22) PCT Filed: Apr. 20, 2023

(86) PCT No.: PCT/CN2023/089528

§ 371 (c)(1),
(2) Date: Oct. 18, 2024

(87) PCT Pub. No.: WO2023/202669

PCT Pub. Date: Oct. 26, 2023

(65) Prior Publication Data

US 2025/0260696 A1 Aug. 14, 2025

(30) Foreign Application Priority Data

Apr. 21, 2022 (CN) ......................... 202210425490.4

(51) Int. Cl.

*G06F 9/451* (2018.01)
*G06F 3/0482* (2013.01)
*G06F 3/04842* (2022.01)
*H04L 9/40* (2022.01)

(52) U.S. Cl.

CPC .......... *H04L 63/102* (2013.01); *G06F 3/0482* (2013.01); *G06F 3/04842* (2013.01); *G06F 9/451* (2018.02); *G06F 9/453* (2018.02); *H04L 63/105* (2013.01)

(58) Field of Classification Search

CPC ..... H04L 63/10; H04L 63/102; H04L 63/105; G06F 9/44; G06F 9/451; G06F 9/453; G06F 3/048; G06F 3/0484; G06F 3/04842

See application file for complete search history.

(56) References Cited

U.S. PATENT DOCUMENTS

| | | | | |
|---|---|---|---|---|
| 10,223,653 | B1 * | 3/2019 | Song | G06Q 10/063114 |
| 2012/0180135 | A1 * | 7/2012 | Hodges | G06Q 10/10<br>709/224 |
| 2014/0279042 | A1 | 9/2014 | Elimeliah et al. | |

FOREIGN PATENT DOCUMENTS

| | | | |
|---|---|---|---|
| CN | 103581040 | A | 2/2014 |
| CN | 107786659 | A | 3/2018 |
| CN | 108256981 | A | 7/2018 |
| CN | 109302461 | A | 2/2019 |
| CN | 109688418 | A | 4/2019 |
| CN | 110162359 | A | 8/2019 |
| CN | 111046276 | A | 4/2020 |
| CN | 111340455 | A | 6/2020 |
| CN | 111399629 | A | 7/2020 |
| CN | 112150319 | A | 12/2020 |

OTHER PUBLICATIONS

European Patent Office, Extended European Search Report Issued in Application No. 23791321.5, Dec. 23, 2024, 9 pages.

ISA China National Intellectual Property Administration, International Search Report and Written Opinion Issued in Application No. PCT/CN2023/089528, May 22, 2023, WIPO, 12 pages.

China National Intellectual Property Administration, Office Action and Search Report Issued in Application No. 202210425490.4, Jun. 17, 2026, 30 pages.

* cited by examiner

*Primary Examiner* — D'Arcy Winston Straub
(74) *Attorney, Agent, or Firm* — Alleman Hall LLP

(57) ABSTRACT

An information processing method and apparatus, a device and a medium. The method includes: in response to a registration request of a target account on a target application, acquiring service attribute information of the target account (101); according to the service attribute information of the target account, determining operation guidance information corresponding to the service attribute information, and displaying message reminder information (102); and in response to a viewing operation of the target account on the message reminder information, displaying the operation guidance information (103).

19 Claims, 4 Drawing Sheets

INFORMATION PROCESSING METHOD AND APPARATUS, DEVICE AND MEDIUM

CROSS-REFERENCE TO RELATED APPLICATIONS

This application is a U.S. National Stage Application under 35 U.S.C. § 371 of International Patent Application No. PCT/CN2023/089528, filed on Apr. 20, 2023, which is based on and claims the benefit of priority to the Chinese patent application No. 202210425490.4 filed on Apr. 21, 2022, which are hereby incorporated by reference in their entirety into the present application.

TECHNICAL FIELD

The present disclosure relates to the field of computer application technology, in particular to an information processing method, apparatus and device and a medium.

BACKGROUND

With the rise of computer technology, an online service realized based on an application has become common, for example, online shopping. In related art, the online service provider needs to master the service functions of an online application.

SUMMARY

The embodiments of the present disclosure provide an information processing method. The method comprises: obtaining service attribute information of a target account, in response to a registration request of the target account on a target application; determining operation guidance information corresponding to the service attribute information, according to the service attribute information of the target account, and displaying the message reminding information; and displaying the operation guidance information, in response to a viewing operation of the target account on the message reminding information.

The embodiments of the present disclosure also provide an information processing apparatus. The apparatus comprises: an obtaining module configured to obtain service attribute information of a target account, in response to a registration request of the target account on a target application; a determining module configured to determine operation guidance information corresponding to the service attribute information, according to the service attribute information of the target account; a first display module configured to display the message reminding information; and a second display module configured to display the operation guidance information, in response to a viewing operation of the target account on the message reminding information.

The embodiments of the present disclosure also provide an electronic device. The electronic device comprises: a processor; a memory for storing instructions executable by the processor; wherein the processor is configured to read the executable instructions from the memory and execute the executable instructions to implement the information processing method provided by the embodiments of the present disclosure.

The embodiments of the present disclosure also provide a non-transitory computer-readable storage medium. The computer-readable storage medium stores a computer program for performing the information processing method provided by the embodiments of the present disclosure.

The embodiments of the present disclosure also provide a computer program product. The information processing method provided by the embodiments of the present disclosure is implemented when instructions in the computer program product are executed by a processor.

The embodiments of the present disclosure also provide a computer program, comprising: instructions that, when executed by a processor, cause the processor to perform the information processing method provided by the embodiments of the present disclosure.

BRIEF DESCRIPTION OF THE ACCOMPANYING DRAWINGS

The above-described and other features, advantages and aspects of embodiments of the present disclosure will become more apparent in conjunction with the accompanying drawings and with reference to the following detailed description. Throughout the accompanying drawings, the same or similar reference numerals indicate the same or similar elements. It should be understood that the accompanying drawings are schematic, and the members and elements are not necessarily drawn to scale.

DETAILED DESCRIPTION

Figure 1:
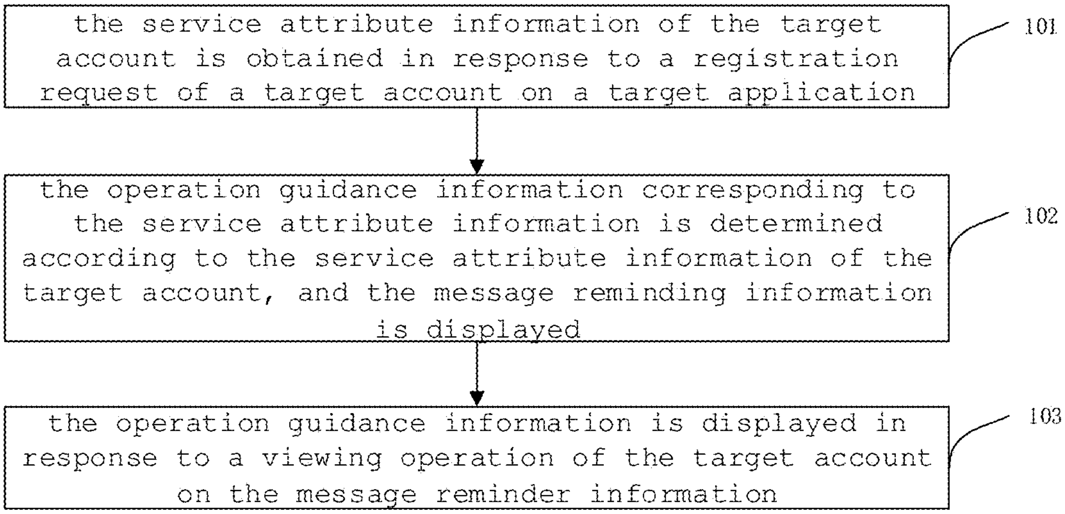
FIG. 1 is a flowchart of an information processing method provided by some embodiments of the present disclosure.

The embodiments of the present disclosure will be described in more detail with reference to the accompanying drawings below. Although the accompanying drawings illustrate some embodiments of the present disclosure, it should be understood that the present disclosure may be implemented in various forms, and should not be construed as being limited to the embodiments set forth herein. Rather, these embodiments are intended for a more thorough and complete understanding of the present disclosure. It should be understood that the accompanying drawings and embodiments of the present disclosure are only for illustrative purposes, rather than for limiting the protection scope of the present disclosure.

It should be understood that the various steps recited in the method embodiments of the present disclosure may be performed according to different sequences, and/or performed in parallel. In addition, the method embodiments may comprise additional steps and/or omit to perform the illustrated steps. The scope of the present disclosure is not limited in this respect.

As used herein, the term "comprising" and its variants are open-ended inclusion, that is, "comprising but not limited to". The term "based on" means "at least partially based on". The term "one embodiment" means "at least one embodiment"; the term "another embodiment" means "at least one additional embodiment"; and the term "some embodiments" means "at least some embodiments". The related definitions of other terms will be given in the following description.

It should be noted that the concepts such as "first" and "second" mentioned in the present disclosure are only used to distinguish different devices, modules or units, but not to limit the order or interdependence of functions performed by these devices, modules or units.

It should be noted that the modifications of "one" and "a plurality of" mentioned in the present disclosure are illustrative rather than restrictive, and those skilled in the art should understand that they should be understood as "one or more" unless contextually specified otherwise.

The names of messages or information exchanged between multiple devices in the embodiments of the present disclosure are only used for illustrative purposes, but not for limiting the scope of these messages or information.

With the gradual diversification of online service functions, difficulties in mastering the service functions of online applications are gradually increasing for online service providers, which brings difficulties to service provision or the like. Therefore, how to guide the service provider to master the functions of online applications or the like has become an urgent problem to be solved.

In order to solve the above-described technical problem, the present disclosure provides an information processing method, apparatus, a device and a medium, which solves the technical problem of increasing difficulty for online service providers to master the service functions of online applications, which made it difficult to provide services or the like.

In order to solve the above-described problem, the embodiments of the present disclosure provide an information processing method, in which the corresponding operation guidance information is initiatively matched to guide the user to understand the functions which are helpful to the user's operation, which brings convenience to service provision and reduces the learning cost.

This method is introduced below in conjunction with specific embodiments. FIG. 1 is a flow view of an information processing method provided by some embodiments of the present disclosure, and this method may be performed by an information processing apparatus, wherein the apparatus may be implemented by software and/or hardware, and generally may be integrated in an electronic device. As shown in FIG. 1, the method comprises the followings.

In Step 101, the service attribute information of the target account is obtained in response to a registration request of a target account on a target application.

The target application comprises any application that provides functional services for a registered user, for example, it may be a backend application of a merchant. The target account is a service account with a service requirement in the target application, and this service requirement usually corresponds to relatively complicated operation functions, which are difficult to be mastered simply. Therefore, in order to facilitate the user's operation and reduce the learning cost, an operation guidance service is initiatively provided based on a target account of this category, so that the target account may rapidly master the operation of related functions or the like.

In the embodiments, considering that different target accounts might require different functions in the target application, for example, for a target account A, the required function is mainly A, and for target account B, the required function is mainly B, so that a corresponding operation guidance service is provided according to the functional requirements of different users.

Therefore, the service attribute information of the target account is obtained, wherein the service attribute information reflects the functional requirements between different target accounts. The service attribute information of the target account comprises, but is not limited to, the service type information of the target account (for example, whether the service type is daily necessities or jewelry), the service stage information (for example, a service duration, a service level), and the login times information (for example, whether it is the first login). In response to the service attribute information being different, the operation guidance service corresponding to the target account is different. For example, for a target account with a service duration of 8 years, which is more in need of guide operations are some newly developed service functions with higher authority in the target application. For a target account with a service duration of 10 days, which is more in need of guide operations are some basic service functions in the target application.

In Step 102, the operation guidance information corresponding to the service attribute information is determined according to the service attribute information of the target account, and the message reminding information is displayed.

The operation guidance information is configured to guide the target account how to provide services, for example, how to put a provided product on sale and how to sign up for promotional activities. The operation guidance information comprises, but is not limited to, links, files, videos, and the like. The operation documents may be displayed in the form of cards or the like. The function module comprises the entries of a plurality of function plug-ins matched with the attribute information, for example, the query function entrance for the number of services, the query entrance for the click rate of the product.

In some embodiments, the service attribute information of the target account may be sent to the server, so that the server may obtain the operation guidance information matched with the service attribute information according to the service attribute information. The operation guidance information is individually customized according to the service attribute information, so that the operation guidance information is more matched with the operation guidance requirements of the target account.

It is to be noted that, in practical application, the client where the target application is installed sends the service attribute information of the target account to a preset server to obtain the operation guidance information corresponding to the service attribute information.

In some embodiments, the operation guidance information corresponding to the target account may also be generated locally on the client. The client may obtain the service attribute information of the target account in different ways. Examples are as follows.

Figure 2:
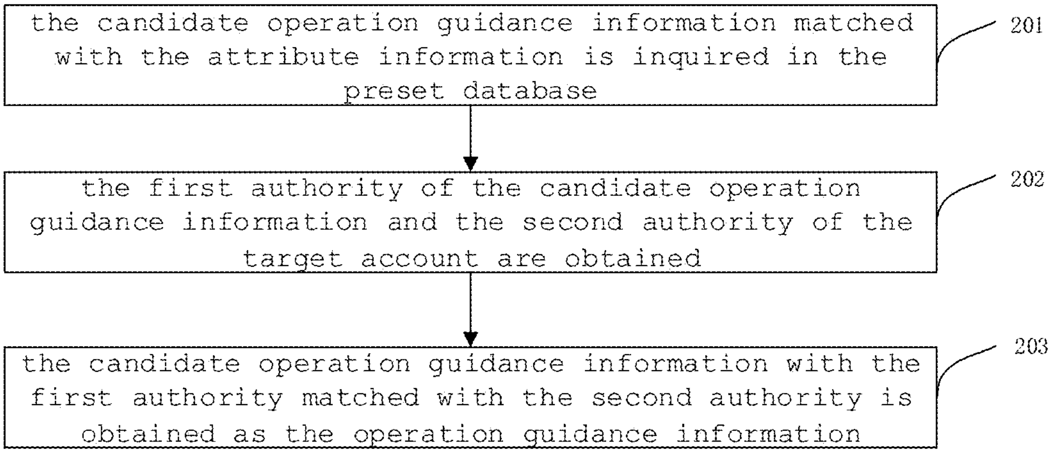
FIG. 2 is a flowchart of another information processing method provided by some embodiments of the present disclosure.

In some embodiments, as shown in FIG. 2, the obtaining the operation guidance information matched with the attribute information comprises the following steps.

In Step 201, the candidate operation guidance information matched with the attribute information is inquired in the preset database.

It may be understood that, the operation guidance information of various functional services of the product and the standard attribute information corresponding to each type of operation guidance information are stored in advance. In the embodiments, the preset database is inquired to obtain the candidate operation guidance information matched with the attribute information.

In Step 202, the first authority of the candidate operation guidance information and the second authority of the target account are obtained.

In the embodiments, even if the service type of the target account A is the same as that of the target account B, both of them might have different authorities in the application, which results in that different service functions being operatable. Therefore, in order to further improve individual recommendation of the guidance information, the first authority of the candidate operation guidance information and the second authority of the target account are obtained, and the first authority and the second authority may be registered in advance by the system.

It is to be noted that, in the embodiments, in response to the same user registering two different types of accounts belonging to a service product (for example, a personal account and a merchant account), or different accounts have an association relationship set in advance, the authorities of different accounts may be shared with each other with the permission of the user so as to further improve the convenience of operation. For example, the service account-target account C and the personal account D correspond to the same user, even if the current login is the account D, the authority information of the target account C may also be provided as the second authority.

In Step 203, the candidate operation guidance information with the first authority matched with the second authority is obtained as the operation guidance information.

In the embodiments, the candidate operation guidance information with the first authority matched with the second authority is obtained as the operation guidance information, so as to realize the filtering of operation guidance information based on two dimensions of authority and attribute, thereby further improving the practicability of the recommended operation guidance information.

In some embodiments, the operation guidance information recommended in history may be reused. For example, a correspondence between the historical operation guidance information recommended and the corresponding historical attribute information may be stored in advance; the similarity between the attribute information of the target account and the historical attribute information may be calculated; and the operation guidance information corresponding to the historical attribute information with similarity greater than a certain value may be taken as the operation guidance information matched with the target account.

In some embodiments, after the operation guidance information matched with the service attribute information of the target account is determined, the message reminding information is displayed to prompt the user to view the corresponding operation guidance information. For the method of displaying the message reminding information, reference may be made to the following embodiments, which will not be described in detail here.

In Step 103, the operation guidance information is displayed in response to a viewing operation of the target account on the message reminder information.

The viewing operation of the target account on the message reminder information differs in different application scenarios. For example, the viewing operation may be performed in the form of voice. For example, the viewing operation may be performed by gesture operation. For another example, the viewing operation may be performed by clicking on the message reminding information.

In the embodiments, in response to obtaining the viewing operation of the target account on the message reminder information, the operation guidance information is displayed. On the basis of the operation guidance information, the user may rapidly know the related functions of the target application and the operation methods of the related functions, so as to prevent that the user inquires the related functions manually, or even cannot know the related functions so as to affect the use experience.

Compared with the prior art, the technical solution provided by the embodiments of the present disclosure has the following advantages.

In the information processing solution provided by the embodiments of the present disclosure, the operation guidance information is matched based on the service attribute information of the target account, and then the operation guidance information is recommended to the target account by message reminding, so that the target account may initiatively match and send the corresponding operation guidance information without initiative inquiring, thereby reducing the learning cost of the user on the application and providing convenience for the user's operation on the application.

In some embodiments, in order to facilitate providing the corresponding operation guidance information by following the service attribute information of the user, whether the service attribute information of the user changes may also be monitored. In response to the service attribute information of the user changing, the changed service attribute information of the target account is sent to the server. In response to the operation guidance information corresponding to the changed service attribute information sent by the server, the operation guidance information is sent to the target account, so as to mine user requirement and push the operation guidance information in advance, thereby further improving the operation experience of the user.

Of course, during the actual performing process, in order to further ensure that a new function of the target application can be rapidly known by the relevant accounts, in some embodiments, in response to the target application having a new functional service, the standard service attribute information corresponding to the new functional service may also be obtained. The standard service attribute information is matched with the service attribute information of the registered target account of the target application. After the successfully matched target account is determined, in response to detecting that the target application is in a login state, the operation guidance information corresponding to the new functional service is pushed to the corresponding successfully matched target account, so as to facilitate that the relevant new function of the target application is rapidly used. The operation guidance information corresponding to the new functional service may be preset or generated according to a deep learning model trained in advance, which is not limited here.

To sum up, in the information processing method of the embodiment of the present disclosure, the operation guidance information is matched based on the service attribute information of the target account, and then the operation guidance information is recommended to the target account by message reminding, so that the target account may initiatively match and send the corresponding operation guidance information without initiative inquiring, which reduces the learning cost of the user for the application and provides convenience for the user's operation on the application.

On the basis of the above-described embodiments, the operation guidance information may be displayed by different methods in different application scenarios.

In some embodiments, the operation guidance information may be displayed in the form of a pop-up window.

In some embodiments, the operation guidance information is recommended with a session as a carrier, that is, this product performs information interaction in the form of a session with more compatibility, which provides technical support for convenient and flexible operation, and facilitates the user to repeatedly view the corresponding operation guidance information.

Figure 3:
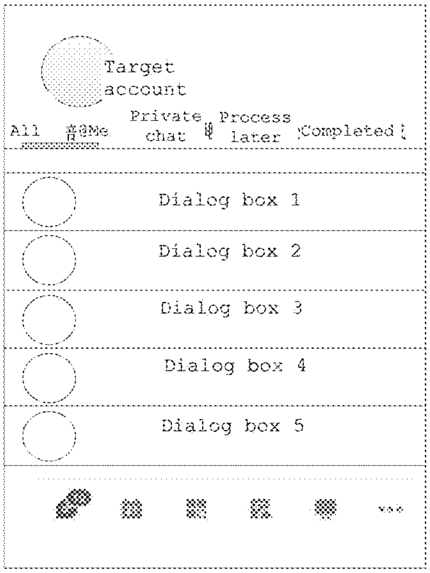
FIG. 3 is a schematic diagram of an information processing scenario provided by some embodiments of the present disclosure.

In the embodiments, as shown in FIG. 3, a plurality of session boxes may be displayed on the service interface of the target account. Therefore, interaction may be performed based on the session boxes, for example, obtaining the relevant operation guidance information based on the session boxes.

Figure 4:
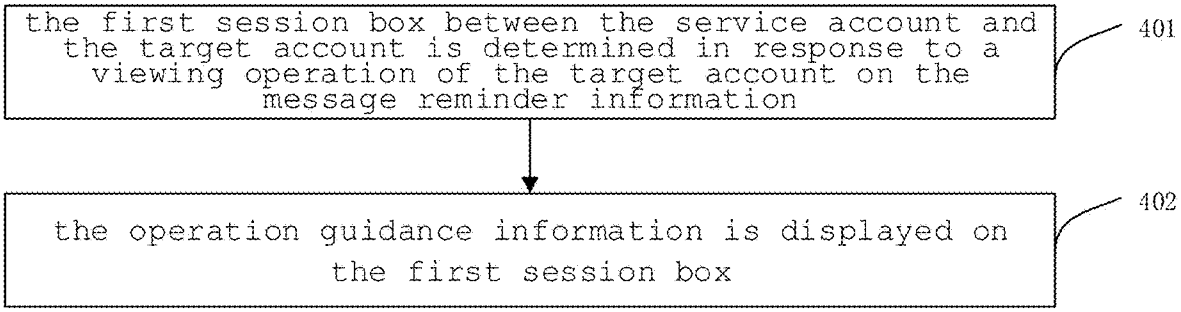
FIG. 4 is a flowchart of another information processing method provided by some embodiments of the present disclosure.

In some embodiments, as shown in FIG. 4, the displaying the operation guidance information in response to a viewing operation of the target account on the message reminder information comprises the following steps.

In Step 401, the first session box between the service account and the target account is determined in response to a viewing operation of the target account on the message reminder information.

The first session box may be understood as a private dialog box set in advance, and other target accounts than the target account cannot receive a message in this dialog box.

In Step 402, the operation guidance information is displayed on the first session box.

In some embodiments, a preset push account is set in advance based on an interactive logic of the session box. The account name of the push account may be a perceptual name such as "service assistant" or a user-defined name, which is not limited here.

Therefore, the corresponding operation guidance information is sent based on the preset first session box between the push account and the target account. The user inquires the operation guidance information in the corresponding first session box, and the operation guidance information is matched with the service attribute information of the target account, so that the target account may be guided to perform the required functional operations, so as to provide better service.

In different application scenarios, the content comprised in the operation guidance information is different, and the content of the operation guidance information is different. This allows for further facilitation of the target account to rapidly master the required services in the product, and the product functions guidance from multiple dimensions is further performed based on the operation guidance information. Examples are described as follows.

In some embodiments, the operation guidance information comprises a session group link, which corresponds to a session group comprising a plurality of target accounts. The session group comprises, but is not limited to, a recommended activity sign-up group, an industry group, an answering group, a matching group, an attendance group and the like.

In the embodiments, at least one session group link matched with the service attribute information is determined. For example, the session group link matched according to the current service stage information of the target account may correspond to a historical session group, or a new session group created by the current product according to new activities or services.

In response to a trigger operation of the target account on the session group link, the target account is added to a corresponding session group, and a second session box corresponding to the session group link is displayed. The second session box contains a plurality of target accounts. Thus, the push cost may be further reduced by pushing the group operation guidance information based on the second session box, and the sent group guidance information may be known by a plurality of target accounts on the second session box without individual push one by one.

In the embodiments, the group operation guidance information of the session group link is obtained, and the group operation guidance information is displayed on the second session box. The group operation guidance information may be one or more of a text form, a video form, an animation form and the like. For example, in response to the session group link corresponds to an attendance session group, the group operation guidance information of the session group link may be a flow video of an attendance operation or the like.

In the embodiments, the group operation guidance information is sent in the form of a dialog on the second session box, and the question information sent by the target account on the second session box may also be obtained on the second session box. This question information may be triggered by a preset menu control, and may also be triggered by associating a preset push account by a preset association identifier on the second session box. The preset association identifier may be any preset identification information set in advance for representing the identification information interacting with the push account, for example, the preset association identifier may be "@" or the like.

The question information may be sent to the server to obtain the corresponding answer information. The answer information corresponding to the question information may also be obtained by inquiring a local preset database.

In the embodiments, in response to obtaining the corresponding answer information, in order to protect the information security of the target account, the security level of the question information is further determined. For example, each keyword in the answer information and the question information is identified to determine whether the keywords comprise a preset sensitive keyword. In response to a sensitive keyword being comprised, the security level is determined according to the number of sensitive keywords comprised. The greater the number of sensitive keywords is, the higher the corresponding security level is.

In response to the security level being greater than a preset security level threshold, it is indicated that the information security degree of the current answer information is low. Therefore, not only the activity degree of the session group is improved, but also the push cost is reduced. The answer information is displayed on the second session box, which is convenient for other target accounts to also know the corresponding answer information, and avoids resource waste due to repeated questions.

In some embodiments, in response to the security level of the question information being less than or equal to a preset security level threshold, it is indicated that the information security degree of the question information is high. Therefore, in order to protect the information security of the target account, the answer information is displayed on the first session box. In other words, the answer information with high information security is sent in the form of "private session".

Figure 5:
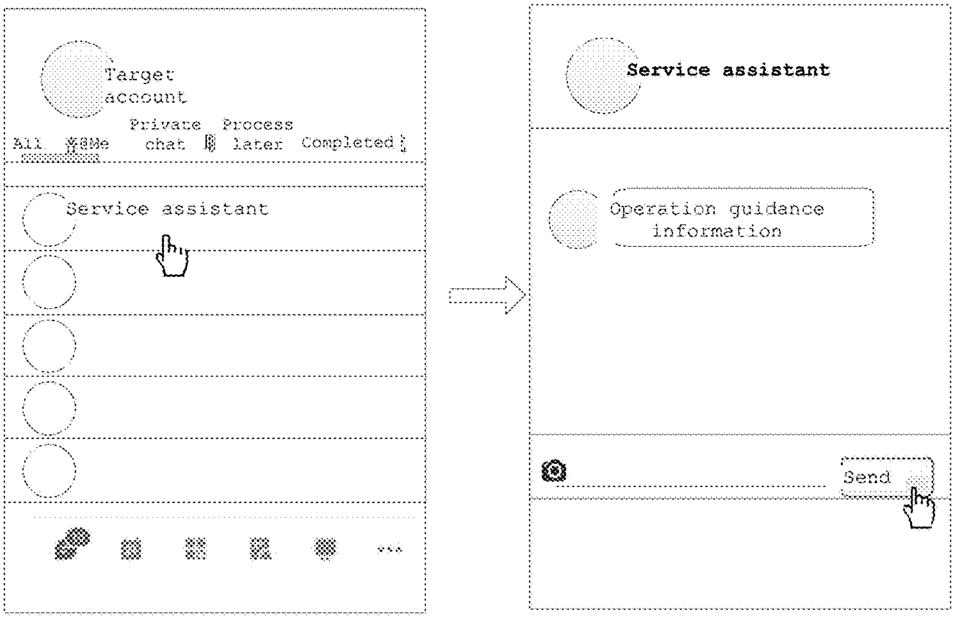
FIG. 5 is a schematic diagram of another information processing scenario provided by some embodiments of the present disclosure.

In the embodiments, the session box between the push account and the target account is determined as the first session box. That is, as shown in FIG. 5, in response to the push account being "service assistant", the session box between the target account and the "service assistant" may be taken as the first session box to push the answer information corresponding to the question information with a security level less than a preset security level threshold.

In order to further ensure information security, in response to the security level being less than or equal to a preset security level threshold, the account level of the target account is also required to be verified before the answer information is displayed on the first session box. Only in response to the account level being high, the answer information is displayed. That is, for some answers with high information security, whether the target account has a viewing qualification may be determined further. For example, for some question information with a high authority, some target accounts with a low authority are not qualified to obtain the corresponding answer information. For example, only some merchant accounts with long operation time can participate in the answer information of some promotional activities with a high participation threshold. Therefore, some new merchant accounts are not qualified to obtain the answer information of corresponding promotion activities.

Therefore, in the embodiments, the account identification of the target account is obtained, wherein the account identification may be any parameter representing a target account level, for example, an account star rating or an account score, and the account level is determined according to the account identification. For example, according to the account identification, a preset correspondence is inquired to obtain the account level and the like, and the answer information is pushed only in response to determining the account level to be higher than a preset account level. Otherwise, a notice message for refusing to answer because of inadequate authority is pushed to the corresponding target account.

To sum up, in the information processing method of the embodiment of the present disclosure, the operation guidance information may be pushed in the form of a session box, and the session box matched with the security level of the operation guidance information may be selected to push the operation guidance information to improve the activity degree of related sessions while ensuring the security of the operation guidance information.

On the basis of the above-described embodiments, in order to further meet some functional requirements of the user for the target application, the required functions of the target account are provided by plug-ins. In response to sending the operation guidance information by the display of the above-described dialog box, the entrance of the function page is provided, so as to better provide service guidance for the target account.

Figure 6:
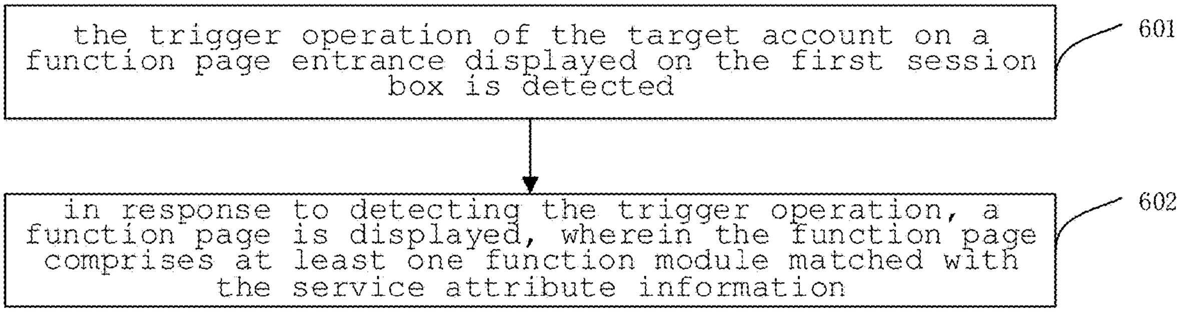
FIG. 6 is a flowchart of another information processing method provided by some embodiments of the present disclosure.

In the embodiments, as shown in FIG. 6, the method further comprises the following steps.

In Step 601, the trigger operation of the target account on a function page entrance displayed on the first session box is detected.

In Step 602, in response to detecting the trigger operation, a function page is displayed, wherein the function page comprises at least one function module matched with the service attribute information.

The function page comprises a plurality of function modules matched with the service attribute information. The function module comprises, but is not limited to, the function required to be frequently used by the target account with the corresponding attribute information. For example, for the target account in an initial stage of the service, the functional module corresponding to the target account comprises a "learning module" or the like.

In the embodiments, a function page is generated according to at least one function module, and the function page is customized with a function module matched with the service attribute information of the target account. The functional service may be provided for the target account in a centralized form, and the page entrance of the function page may be displayed on the first session box, so as to display a corresponding function page in response to a trigger operation of the target account on the page entry. Further, the target functional service is provided in response to a trigger operation of the target function module on the function page.

Figure 7:
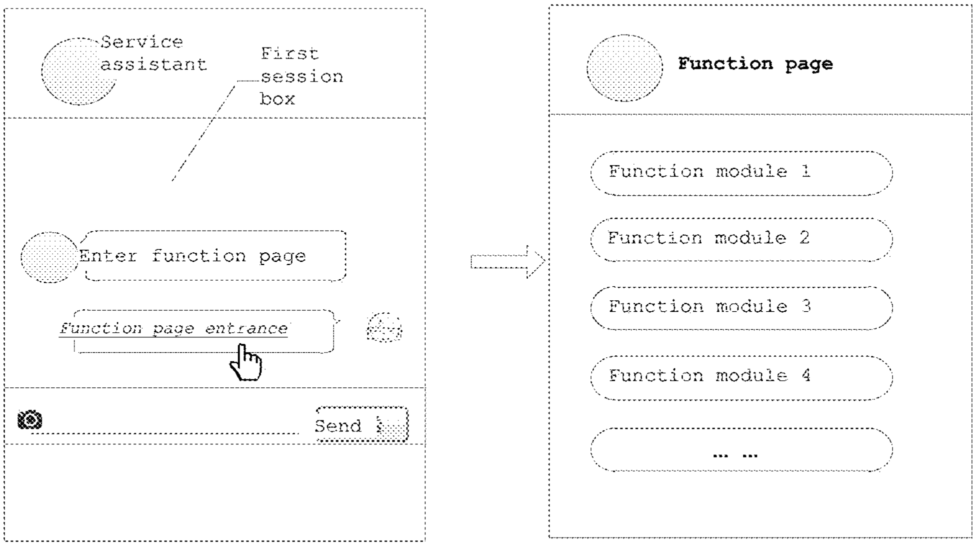
FIG. 7 is a schematic diagram of another information processing scenario provided by some embodiments of the present disclosure.

In some embodiments, as shown in FIG. 7, the target account may be displayed on the first session box between the target account and the push account. As shown, the target account obtains an entrance of the function page by asking a question. However, during the actual execution process, the entrance of the function page may also be always displayed on the first session box as a floating window or in other methods, so that the user may rapidly trigger to enter the relevant function page. In the embodiments, in response to detecting a trigger operation of the user on a function page entrance, the function page is displayed. The function page contains at least one function module matched with the service attribute information of the target account. The function page comprises function modules 1 to 4, which are obtained by matching according to the service attribute information of the target account.

In the embodiments, it is possible to jump out of the first dialog box to switch to the display of the corresponding function page. Alternatively, the function page is displayed on the first dialog box, or in the form of a pop-up window or a floating window, which is not limited here.

Figure 8:
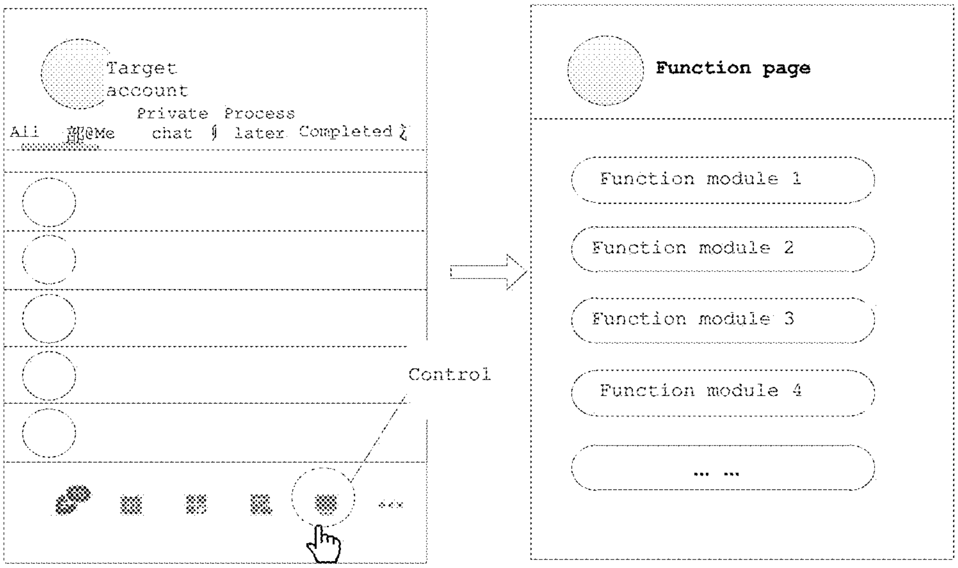
FIG. 8 is a schematic diagram of another information processing scenario provided by some embodiments of the present disclosure.

In other embodiments of the present disclosure, as shown in FIG. 8, the function page may be displayed on a service page of the product. For example, as shown in FIG. 8, the page entrance may be set at the bottom of the service page of the product in the form of a control, so as to facilitate rapid use of the target account. In response to the control being triggered, jumping to the function page integrated with the function modules 1 to 4 of the target account, and the function modules 1 to 4 are obtained by matching according to the service attribute information of the target account.

To sum up, in the information processing method of the embodiments of the present disclosure, customized function modules may be provided for the user based on the function page, which is convenient for the user to rapidly perform related functions and further expands the dimension of providing the guidance information for the target account, thereby further reducing the learning cost of the user on the application and providing convenience for the user's operation on the product.

In order to realize the above-described embodiments, the present disclosure provides an information processing apparatus.

Figure 9:
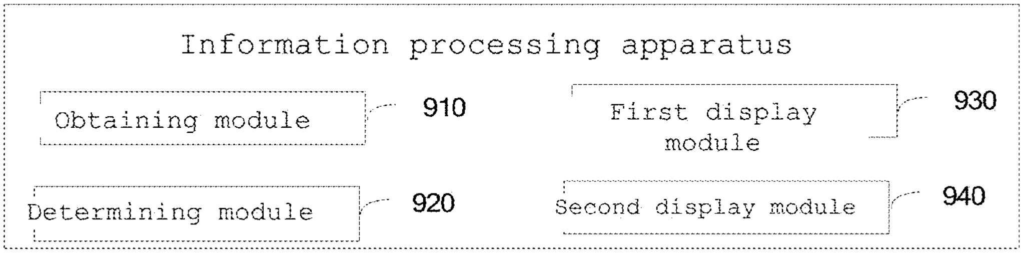
FIG. 9 is a schematic structural diagram of an information processing apparatus provided by some embodiments of the present disclosure.

FIG. 9 is a schematic structural diagram of an information processing apparatus provided by some embodiments of the present disclosure, which may be realized by software and/or hardware, and generally may be integrated in an electronic device. As shown in FIG. 9, the device comprises an obtaining module 910, a determining module 920, a first display module 930 and a second display module 940.

The obtaining module 910 is configured to obtain the service attribute information of the target account in response to a registration request of the target account on the target application.

The determining module 920 is configured to determine the corresponding operation guidance information according to the service attribute information of the target account.

The first display module 930 is configured to display the message reminding information.

The second display module 940 is configured to display the operation guidance information in response to a viewing operation of the target account on the message reminder information.

The information processing device provided by the embodiments of the present disclosure may perform the information processing method provided by any embodiment of the present disclosure, and possesses corresponding functional modules and beneficial effects to perform the method.

In order to realize the above-described embodiments, the present disclosure also provides a computer program product, comprising computer programs/instructions that, when executed by a processor, implement the information processing method in the above-described embodiments.

Figure 10:
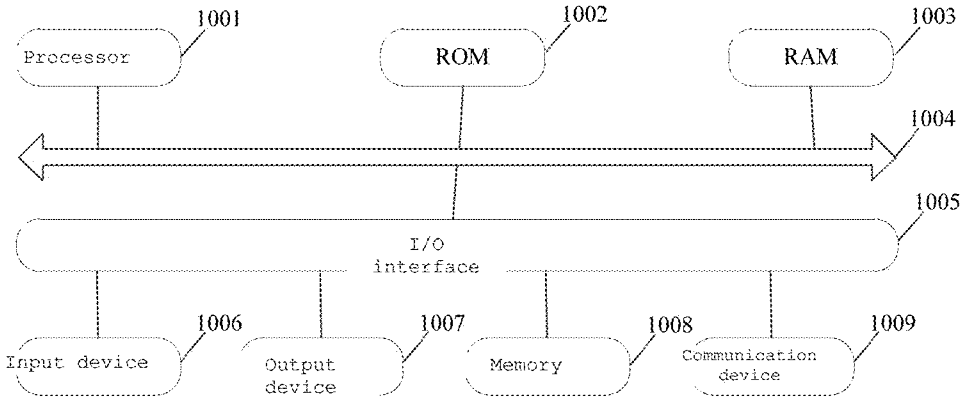
FIG. 10 is a schematic structural diagram of an electronic device provided by some embodiments of the present disclosure.

FIG. 10 is a schematic structural diagram of an electronic device provided by some embodiments of the present disclosure.

Next, specifically refer to FIG. 10, which shows a structural schematic diagram of an electronic device 1000 suitable for implementing the embodiment of the present disclosure. The electronic device 1000 in the embodiment of the present disclosure may comprise, but is not limited to, mobile terminals such as mobile phones, notebook computers, digital broadcast receivers, PDA (personal digital assistant), PAD (pad computer), PMP (Portable Multimedia Player) and in-vehicle terminals (for example, in-vehicle navigation terminals); and fixed terminals such as digital TVs, desktop computers and the like. The electronic device shown in FIG. 10 which is only an example, shall not limit the functions and application range of the embodiments of the present disclosure.

As shown in FIG. 10, the electronic device 1000 may comprise a processor (for example, a central processing unit, a graphics processor or the like) 1001, which may perform various appropriate actions and processing according to a program stored in a read-only memory (ROM) 1002 or a program loaded from a memory 1008 into a random access memory (RAM) 1003. In the RAM 1003, various programs and data required for the operation of the electronic device 1000 are also stored. The processor 1001, the ROM 1002 and the RAM 1003 are connected to each other through a bus 1004. The input/output (I/O) interface 1005 is also connected to the bus 1004.

Generally, the following devices may be connected to the I/O interface 1005: an input device 1006 comprising, for example, a touch screen, a touch pad, a keyboard, a mouse, a camera, a microphone, an accelerometer, a gyroscope, and the like; an output device 1007 comprising, for example, a Liquid Crystal Display (LCD), a speaker, a vibrator, and the like; a memory 1008 comprising, for example, a magnetic tape, a hard disk, and the like; and a communication device 1009. The communication device 1009 may allow the electronic device 1000 to be in wireless or wired communication with other devices to exchange data. Although FIG. 10 shows the electronic device 1000 with various devices, it should be understood that there is no requirement to implement or have all the devices shown. It is possible to alternatively implement or possess more or less devices.

In particular, according to some embodiments of the present disclosure, the process described above with reference to the flowchart may be implemented as a computer software program. For example, in some embodiments of the present disclosure, there comprises a computer program product, which comprises a computer program carried on a non-transient computer-readable medium, wherein the computer program contains program codes for executing the method shown in the flowchart. In such embodiment, the computer program may be downloaded and installed from the network through the communication device 1009, installed from the memory 1008, or installed from the ROM 1002. When the computer program is executed by the processor 1001, the above-described functions defined in the information processing method of the embodiment of the present disclosure are performed.

It is to be noted that, the above-described computer-readable medium of the present disclosure may be a computer-readable signal medium, a computer-readable storage medium or any combination thereof. The computer-readable storage medium may be, for example, but is not limited to: an electrical, magnetic, optical, electromagnetic, infrared, or semiconductor system, device, or apparatus, or a combination thereof. More specific examples of the computer-readable storage medium may comprise, but is not limited to: an electrical connection having one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable storage medium may be any tangible medium that contains or stores a program which may be used by an instruction execution system, apparatus, or device or used in combination therewith. In the present disclosure, the computer-readable signal medium may comprise a data signal propagated in a baseband or as a part of a carrier wave, wherein a computer-readable program code is carried. Such propagated data signal may take many forms, comprising but not limited to an electromagnetic signal, an optical signal, or any suitable combination thereof. The computer-readable signal medium may also be any computer-readable medium other than the computer-readable storage medium. The computer-readable signal medium may send, propagate, or transmit a program for use by an instruction execution system, apparatus, or device or in combination with therewith. The program code contained on the computer-readable medium may be transmitted by any suitable medium, comprising but not limited to: a wire, an optical cable, radio frequency (RF), and the like, or any suitable combination thereof.

In some embodiments, the client and the server may communicate using any currently known or future developed network protocol such as HTTP (HyperText Transfer Protocol), and may be interconnected with digital data communication in any form or medium (for example, communication network). Examples of communication networks comprise a Local Area Network ("LAN"), a Wide Area Network ("WAN"), an extranet (for example, Internet) and an end-to-end network (for example, an ad hoc end-to-end network), as well as any currently known or future developed network.

The above-described computer-readable medium may be comprised in the above-described electronic device; or may also exist alone without being assembled into the electronic device.

The above-described computer-readable medium carries one or more programs that, when executed by the electronic device, cause the electronic device to: match the operation guidance information based on the service attribute information of the target account, and recommend the operation guidance information for the target account by message reminding. The target account may initiatively match and send the corresponding operation guidance information without initiative inquiring, which reduces the learning cost of the user and provides convenience for the user's operation on the application.

In the electronic device, the computer program code for performing the operations of the present disclosure may be written in one or more programming languages or a combination thereof. The above-described programming languages comprise but are not limited to object-oriented programming languages, such as Java, Smalltalk, and C++, and also comprise conventional procedural programming languages, such as "C" language or similar programming languages. The program code may be executed entirely on the user's computer, partly on the user's computer, executed as an independent software package, partly on the user's computer and partly executed on a remote computer, or entirely executed on the remote computer or server. In the case of a remote computer, the remote computer may be connected to the user's computer through any kind of network (comprising a local area network (LAN) or a wide area network (WAN)), or may be connected to an external computer (for example, connected through Internet using an Internet service provider).

The flowcharts and block views in the accompanying drawings illustrate the possibly implemented architectures, functions, and operations of the system, method, and computer program product according to various embodiments of the present disclosure. In this regard, each block in the flowchart or block view may represent a module, a program segment, or a part of code, wherein the module, the program segment, or the part of code contains one or more executable instructions for realizing a specified logic function. It should also be noted that, in some alternative implementations, the functions marked in the block may also occur in a different order from the order marked in the accompanying drawings. For example, two blocks shown in succession which may actually be executed substantially in parallel, may sometimes also be executed in a reverse order, depending on the functions involved. It should also be noted that each block in the block view and/or flowchart, and a combination of the blocks in the block view and/or flowchart, may be implemented by a dedicated hardware-based system that performs the specified functions or operations, or may be implemented by a combination of dedicated hardware and computer instructions.

The units involved in the described embodiments of the present disclosure may be implemented in software or hardware. Wherein, the names of the units do not constitute a limitation on the units themselves under certain circumstances.

The functions described hereinabove may be performed at least in part by one or more hardware logic components. For example, without limitation, the hardware logic components of a demonstrative type that may be used comprise: a Field Programmable Gate Array (FPGA), an Application Specific Integrated Circuit (ASIC), an Application Specific Standard Product (ASSP), a System on Chip (SOC), a Complex Programmable Logical device (CPLD) and the like.

In the context of the present disclosure, a machine-readable medium may be a tangible medium, which may contain or store a program for use by the instruction execution system, apparatus, or device or use in combination with the instruction execution system, apparatus, or device. The machine-readable medium may be a machine-readable signal medium or a machine-readable storage medium. The machine-readable medium may comprise, but is not limited to, an electronic, magnetic, optical, electromagnetic, infrared, or semiconductor system, device or device, or any suitable combination thereof. More specific examples of the machine-readable storage medium may comprise an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

According to one or more embodiments of the present disclosure, the present disclosure provides an information processing method. The method comprises the following steps:

obtaining the service attribute information of the target account in response to a registration request of a target account on a target application;

determining the corresponding operation guidance information according to the service attribute information of the target account, and displaying the message reminding information; and displaying the operation guidance information in response to a viewing operation of the target account on the message reminding information.

In some embodiments, the displaying the operation guidance information in response to a viewing operation of the target account on the message reminding information comprises:

determining a first session box between a service account and the target account in response to a viewing operation of the target account on the message reminding information; and displaying the operation guidance information on the first session box.

In some embodiments, the method further comprises:

detecting whether the target account performs a trigger operation on a function page entrance displayed on the first session box; and displaying a function page, in response to detecting the trigger operation, wherein the function page comprises at least one function module matched with the service attribute information.

In some embodiments, the method further comprises, in response to the operation guidance information comprising a session group link:

adding the target account to a session group corresponding to the session group link, in response to a trigger operation of the target account on the session group link, and displaying a second session box corresponding to the session group link; and obtaining group operation guidance information of the session group link, and displaying the group operation guidance information on the second session box.

In some embodiments, the method further comprises:

obtaining the question information sent by the target account on the second session box;

identifying a security level of the question information, in response to obtaining answer information corresponding to the question information; and displaying the answer information on the second session box, in response to the security level being greater than a preset security level threshold.

In some embodiments, the method further comprises:

displaying the answer information on the first session box, in response to the security level being less than or equal to the preset security level threshold.

In some embodiments, the method further comprises, before the first session box displays the answer information:

before the displaying the answer information on the first session box:

obtaining an account identification of the target account, and determining an account level according to the account identification; and determining that the account level is higher than a preset account level.

In some embodiments, the information processing method further comprises: pushing a notice message for refusing to answer to the target account in response to an account level of the target account being lower than or equal to a preset account level.

In some embodiments, the service attribute information comprises at least one of the service type information, the service stage information or the login times information of the target account.

In some embodiments, the operation guidance information is configured to guide the target account how to provide services.

In some embodiments, the determining the operation guidance information corresponding to the service attribute information comprises: obtaining a first authority of the candidate operation guidance information and a second authority of the target account; and obtaining the candidate operation guidance information with the first authority matched with the second authority as the operation guidance information.

According to one or more embodiments of the present disclosure, the present disclosure provides an information processing apparatus. The apparatus comprises:

an obtaining module configured to obtain the service attribute information of the target account in response to a registration request of a target account on a target application;

a determining module configured to determine the corresponding operation guidance information according to the service attribute information of the target account;

a first display module configured to display the message reminding information; and a second display module configured to display the operation guidance information in response to a viewing operation of the target account on the message reminder information.

In some embodiments, the second display module is configured to:

determine a first session box between a service account and the target account in response to a viewing operation of the target account on the message reminding information; and display the operation guidance information on the first session box.

In some embodiments, the apparatus further comprises a detecting module configured to:

detect whether the target account performs a trigger operation on a function page entrance displayed on the first session box; and display a function page, in response to detecting the trigger operation, wherein the function page comprises at least one function module matched with the service attribute information.

In some embodiments, the second display module is configured to, in response to the operation guidance information comprising a session group link:

add the target account to a session group corresponding to the session group link, in response to a trigger operation of the target account on the session group link, and displaying a second session box corresponding to the session group link; and obtain group operation guidance information of the session group link, and displaying the group operation guidance information on the second session box.

In some embodiments, the apparatus further comprises a third display module configured to:

obtain question information sent by the target account on the second session box;

identify a security level of the question information, in response to obtaining answer information corresponding to the question information; and display the answer information on the second session box, in response to the security level being greater than a preset security level threshold.

In some embodiments, the third display module is further configured to:

display the answer information on the first session box, in response to the security level being less than or equal to the preset security level threshold.

In some embodiments, the third display module is further configured to:

obtaining an account identification of the target account, and determining an account level according to the account identification, before the displaying the answer information on the first session box; and determine that the account level is higher than a preset account level.

In some embodiments, the third display module pushes a notice message for refusing to answer to the target account in response to an account level of the target account being lower than or equal to a preset account level.

In some embodiments, the service attribute information comprises at least one of the service type information, the service stage information or the login times information of the target account.

In some embodiments, the operation guidance information is configured to guide the target account how to provide services.

In some embodiments, the third display module obtains a first authority of the candidate operation guidance information and a second authority of the target account; and obtains the candidate operation guidance information with the first authority matched with the second authority as the operation guidance information.

According to one or more embodiments of the present disclosure, the present disclosure provides an electronic device, comprising:

a processor;

a memory for storing executable instructions of the processor;

wherein the processor is configured to read the executable instructions from the memory and execute the instructions to implement any of information processing methods provided by the present disclosure.

According to one or more embodiments of the present disclosure, the present disclosure provides a non-transitory computer-readable storage medium storing a computer program for performing any of the information processing methods provided by the present disclosure.

According to one or more embodiments of the present disclosure, the present disclosure provides a computer program comprising instructions which, when executed by a processor, cause the processor to execute an information processing method provided according to some embodiments of the present disclosure.

The above description is only an explanation of preferred embodiments of the present disclosure and the applied technical principles. Those skilled in the art should understand that the scope of disclosure involved in this disclosure is not limited to the technical solutions formed by the specific combination of the above technical features, and at the same time should also cover other technical solutions formed by arbitrarily combining the above-described technical features or equivalent features without departing from the above disclosed concept. For example, the above-described features and the technical features disclosed in the present disclosure (but not limited thereto) having similar functions are replaced with each other to form a technical solution.

In addition, although the operations are depicted in a specific order, this should not be understood as requiring these operations to be performed in the specific order shown or performed in a sequential order. Under certain circumstances, multitasking and parallel processing might be advantageous. Likewise, although several specific implementation details are contained in the above discussion, these should not be construed as limiting the scope of the present disclosure. Certain features that are described in the context of individual embodiments may also be implemented in combination in a single embodiment. On the contrary, various features described in the context of a single embodiment may also be implemented in multiple embodiments individually or in any suitable sub-combination.

Although the present subject matter has been described in language specific to structural features and/or methodological actions, it should be understood that the subject matter defined in the appended claims is not necessarily limited to the specific features or actions described above. On the contrary, the specific features and actions described above are only exemplary forms of implementing the claims.

What is claimed is:

1. An information processing method, executed by an electronic device, comprising:

obtaining service attribute information of a target account, in response to a registration request of the target account on a target application, wherein the service attribute information comprises at least one of service type information, service stage information, or login times information of the target account;

determining operation guidance information corresponding to the service attribute information, according to the service attribute information of the target account, and displaying the message reminding information; and displaying the operation guidance information, in response to a viewing operation of the target account on the message reminding information, wherein the determining operation guidance information corresponding to the service attribute information, according to the service attribute information of the target account comprises:

sending the service attribute information of the target account to a server; and receiving, from the server, the operation guidance information matched with the service attribute information, wherein the operation guidance information matched with the target account is different, in response to the service attribute information being different.

2. The information processing method according to claim 1, wherein the displaying the operation guidance information, in response to the viewing operation of the target account on the message reminding information comprises:

determining a first session box between a service account and the target account, in response to the viewing operation of the target account on the message reminding information; and displaying the operation guidance information on the first session box.

3. The information processing method according to claim 2, further comprising:

detecting whether the target account performs a trigger operation on a function page entrance displayed on the first session box; and displaying a function page, in response to detecting the trigger operation, wherein the function page comprises at least one function module matched with the service attribute information.

4. The information processing method according to claim 2, further comprising, in response to the operation guidance information comprising a session group link:

adding the target account to a session group corresponding to the session group link, in response to a trigger operation of the target account on the session group link, and displaying a second session box corresponding to the session group link; and obtaining group operation guidance information of the session group link, and displaying the group operation guidance information on the second session box.

5. The information processing method according to claim 4, further comprising:

obtaining question information sent by the target account on the second session box;

identifying a security level of the question information, in response to obtaining answer information corresponding to the question information; and displaying the answer information on the second session box, in response to the security level being greater than a preset security level threshold.

6. The information processing method according to claim 5, further comprising:

displaying the answer information on the first session box, in response to the security level being less than or equal to the preset security level threshold.

7. The information processing method according to claim 6, further comprising, before the displaying the answer information on the first session box:

obtaining an account identification of the target account, and determining an account level according to the account identification; and determining that the account level is higher than a preset account level.

8. The information processing method according to claim 1, further comprising:

pushing a notice message for refusing to answer to the target account, in response to an account level of the target account being lower than or equal to a preset account level.

9. The information processing method according to claim 1, wherein the operation guidance information is configured to express a method of providing a service by the target account.

10. The information processing method according to claim 1, wherein the determining the operation guidance information corresponding to the service attribute information comprises:

obtaining a first authority of candidate operation guidance information and a second authority of the target account; and taking candidate operation guidance information with a first authority matched with the second authority as the operation guidance information.

11. An electronic device, comprising:

a processor; and a memory for storing instructions executable by the processor;

wherein the processor is configured to read the executable instructions from the memory and execute the executable instructions to implement an information processing method, comprising:

obtaining service attribute information of a target account, in response to a registration request of the target account on a target application, wherein the service attribute information comprises at least one of service type information, service stage information, or login times information of the target account;

determining operation guidance information corresponding to the service attribute information, according to the service attribute information of the target account, and displaying the message reminding information; and displaying the operation guidance information, in response to a viewing operation of the target account on the message reminding information, wherein the determining operation guidance information corresponding to the service attribute information, according to the service attribute information of the target account comprises:

sending the service attribute information of the target account to a server; and receiving, from the server, the operation guidance information matched with the service attribute information, wherein the operation guidance information matched with the target account is different, in response to the service attribute information being different.

12. The information processing device according to claim 11, wherein the processor implements following steps:

determining a first session box between a service account and the target account, in response to the viewing operation of the target account on the message reminding information; and displaying the operation guidance information on the first session box.

13. The information processing device according to claim 12, wherein the processor implements following steps:

detecting whether the target account performs a trigger operation on a function page entrance displayed on the first session box; and displaying a function page, in response to detecting the trigger operation, wherein the function page comprises at least one function module matched with the service attribute information.

14. The information processing device according to claim 12, wherein the processor implements following steps, in response to the operation guidance information comprising a session group link:

adding the target account to a session group corresponding to the session group link, in response to a trigger operation of the target account on the session group link, and displaying a second session box corresponding to the session group link; and obtaining group operation guidance information of the session group link, and displaying the group operation guidance information on the second session box.

15. The information processing device according to claim 14, wherein the processor implements following steps:

obtaining question information sent by the target account on the second session box;

identifying a security level of the question information, in response to obtaining answer information corresponding to the question information; and displaying the answer information on the second session box, in response to the security level being greater than a preset security level threshold.

16. The information processing device according to claim 15, wherein the processor implements a following step:

displaying the answer information on the first session box, in response to the security level being less than or equal to the preset security level threshold.

17. The information processing device according to claim 16, wherein the processor implements following steps, before the displaying the answer information on the first session box:

obtaining an account identification of the target account, and determining an account level according to the account identification; and determining that the account level is higher than a preset account level.

18. The information processing device according to claim 12, wherein the processor implements a following step:

pushing a notice message for refusing to answer to the target account, in response to an account level of the target account being lower than or equal to a preset account level.

19. A non-transitory computer-readable storage medium, wherein the computer-readable storage medium stores a computer program for performing an information processing method, comprising:

obtaining service attribute information of a target account, in response to a registration request of the target account on a target application, wherein the service attribute information comprises at least one of service type information, service stage information, or login times information of the target account;

determining operation guidance information corresponding to the service attribute information, according to the service attribute information of the target account, and displaying the message reminding information; and displaying the operation guidance information, in response to a viewing operation of the target account on the message reminding information, wherein the determining operation guidance information corresponding to the service attribute information, according to the service attribute information of the target account comprises:

sending the service attribute information of the target account to a server; and receiving, from the server, the operation guidance information matched with the service attribute information, wherein the operation guidance information matched with the target account is different, in response to the service attribute information being different.

* * * * *